US012562581B2

(12) United States Patent
Moubedi et al.

(10) Patent No.: US 12,562,581 B2
(45) Date of Patent: Feb. 24, 2026

(54) BATTERY BALANCING FOR MULTI-BATTERY SYSTEMS

(71) Applicants: Shaheen Moubedi, Los Angeles, CA (US); Gerald Nilles, Culver City, CA (US); Stephen Pomes, Santa Monica, CA (US)

(72) Inventors: Shaheen Moubedi, Los Angeles, CA (US); Gerald Nilles, Culver City, CA (US); Stephen Pomes, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 805 days.

(21) Appl. No.: 17/965,421

(22) Filed: Oct. 13, 2022

(65) Prior Publication Data

US 2024/0014668 A1    Jan. 11, 2024

Related U.S. Application Data

(60) Provisional application No. 63/358,688, filed on Jul. 6, 2022.

(51) Int. Cl.
    *H02J 7/00*        (2006.01)
    *G02C 11/00*       (2006.01)
(52) U.S. Cl.
    CPC ............ *H02J 7/0016* (2013.01); *G02C 11/10* (2013.01); *H02J 7/0047* (2013.01); *H02J 7/0063* (2013.01); *H02J 2207/20* (2020.01)
(58) Field of Classification Search
    CPC .................................................. H02J 7/0016
    USPC ........................................................ 320/118
    See application file for complete search history.

(56) References Cited

U.S. PATENT DOCUMENTS

| | | | |
|---|---|---|---|
| 2013/0335028 A1 | 12/2013 | Choi | |
| 2014/0015474 A1* | 1/2014 | Tsai | G06F 30/20 |
| | | | 320/103 |
| 2014/0176045 A1* | 6/2014 | Naskali | H02J 7/342 |
| | | | 320/103 |

(Continued)

OTHER PUBLICATIONS

International Search Report and Written Opinion for International Application No. PCT/US2023/026665, dated Oct. 23, 2023 (Oct. 23, 2023)—13 pages.

*Primary Examiner* — Yalkew Fantu
(74) *Attorney, Agent, or Firm* — CM Law; Stephen J. Weed

(57)        ABSTRACT

A closed loop control system actively regulates the battery current paths of physically separated circuits so that the current is approximately the same for each of the circuits regardless of the various system loads. The closed loop control system modulates the current paths by either modulating a high side transistor used to independently limit each battery's current path or by modulating a DC/DC converter's output voltage to independently boost each battery's current path. The closed loop control system is also designed to handle undervoltage lockout (UVLO) situations when one of the batteries is nearing empty to tilt the power balance in the chance that there is an existing battery charge mismatch to support system load bursts and to turn off the circuit when the system current draw is exceptionally low. A tilting circuit also identifies and discharges the battery with the higher charge until the charge states are substantially equal.

20 Claims, 12 Drawing Sheets

(56)     References Cited

U.S. PATENT DOCUMENTS

| 2014/0306666 | A1* | 10/2014 | Choi | .................... H02J 7/0016 |
|---|---|---|---|---|
| | | | | 320/134 |
| 2018/0219389 | A1 | 8/2018 | Binder et al. | |
| 2019/0214831 | A1 | 7/2019 | Kristjansson et al. | |
| 2020/0412132 | A1 | 12/2020 | Kristjansson et al. | |
| 2021/0135478 | A1 | 5/2021 | Schline et al. | |

\* cited by examiner

BATTERY BALANCING FOR MULTI-BATTERY SYSTEMS

TECHNICAL FIELD

Examples set forth herein generally relate to battery systems for mobile electronic devices and, in particular, to a battery balancing system for balancing charging and discharging of multi-battery systems in mobile electronic devices.

BACKGROUND

Mobile electronic devices such as electronic eyewear devices may have electronics disposed in physically separated portions of the devices. For example, electronic eyewear devices may have electronics, such as circuit boards and batteries, disposed in the temples or arms of the electronic eyewear devices. In such cases, the electronics and batteries in the temples or arms are physically separated by the front eyeglass frame and may charge/discharge at different rates, which may cause potential issues with battery health, reliability, and safety.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1A:
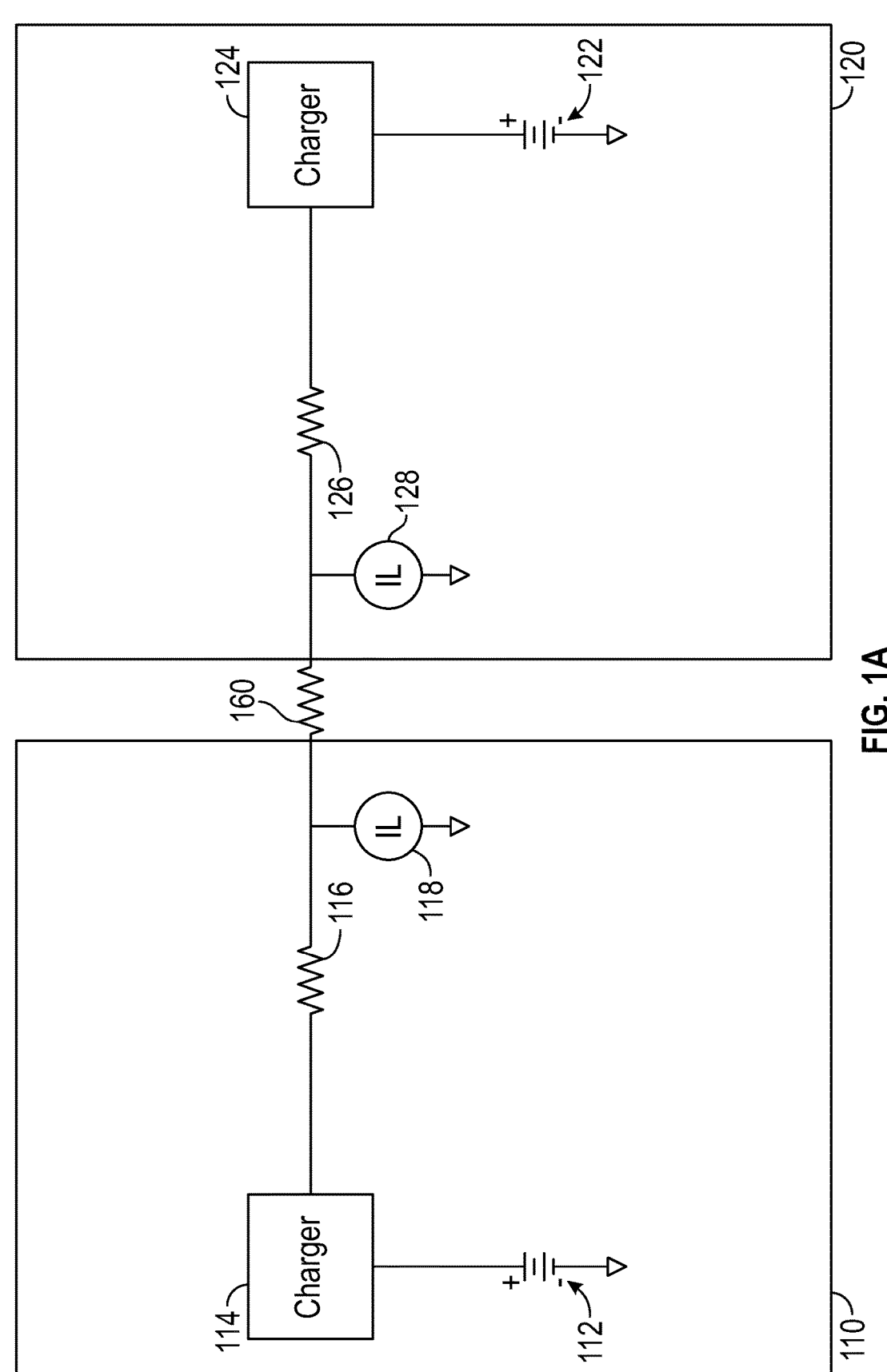
FIG. 1A is a block diagram of a mobile device having circuits that are physically separated from each other and powered independently.

The circuits in mobile devices may have varying loads that are powered by different batteries operating independently even though the circuits are part of the same system providing various functionality for the mobile devices. For example, a main processor may be disposed on one side of an electronic eyewear device and consume power according to its load, while a co-processor may be disposed on the other side of the electronic eyewear device and turn on/off independently. Also, because of the electrical resistance separating the left and right sides of the electronic eyewear device, the current supplied by the batteries on the respective sides of the eyewear may vary. This arrangement poses a problem as it is desired to charge and discharge the batteries for the physically displaced electronics in the mobile electronic devices substantially equally to avoid potential issues with battery health, reliability, and safety. Also, while short-term mismatch or a slight mismatch may be acceptable, long-term mismatch and gross errors are not acceptable.

Mobile electronic devices such as electronic eyewear devices may use multiple boards and batteries in various parts of the device in order to optimize for space, heat dissipation, and the like. To ensure good battery health, it is desired to charge and discharge all the batteries used in such devices at substantially the same rate. This becomes challenging because the system loads change dynamically and can become unbalanced, coupled with the added resistance from being physically separated. The circuits described herein measure and modulate the individual battery current paths in order to actively balance their discharge currents.

The circuits described herein measure the high side currents of the batteries and feed the measured currents into a closed loop control system. The closed loop control system actively regulates the battery current paths of the physically separated circuits so that the currents are approximately the same for each of the circuits regardless of the various system loads. The closed loop control system modulates the current paths by either modulating a high side transistor used to independently limit each battery's current path or by modulating a DC/DC converter's output voltage to independently boost the voltage in each battery's current path. The closed loop control system is also designed to prevent undervoltage lockout (UVLO) situations when one of the batteries is nearing empty, to adjust the power balance when there is an existing battery charge mismatch, and to turn off the circuit when the system current draw is exceptionally low. A tilting circuit also may identify and discharge the battery with the higher charge until the charge states of the batteries are substantially equal.

The methods and systems described herein thus relate to a device including physically separated circuits where each circuit includes a battery, a load, and a resistance along the current path to the load. The device (e.g., an electronic eyewear device with circuitry in respective arms or temples separated by the frame) includes a battery balancing control loop that balances charges of the batteries of each circuit.

The battery balancing control loop includes current measuring circuits (e.g., current sensing amplifiers) that measure the currents through the resistances of the circuits, at least one differential amplifier that compares the measured currents to generate an adjustment signal, and current modulating means for modulating the current in the current paths between the batteries and the loads in response to the adjustment signal. The current modulating means modulates a first current in a first current path of a first circuit by at least one of (a) increasing a resistance or decreasing a battery voltage in the first current path or (b) boosting the battery voltage or decreasing the resistance in the first current path. The current modulating means may similarly modulate a second current in a second current path of a second circuit.

The current modulating means may include a transistor in the first current path of the first circuit that dynamically limits the first current in the first current path by adjusting the first resistance in the first current path in response to the adjustment signal until the first currents in the first current path and a second current in the second current path are approximately the same. Alternatively, the current modulating means may include a DC/DC converter responsive to the adjustment signal to increase current in the first current path to balance the first current and the second current. The battery balancing control loop may further include a tilting circuit that checks a charge state of the first and second batteries to determine a charge mismatch and discharges the battery with a higher charge until the charge state of the batteries are substantially equal. The tilting circuit may include a transistor in one or more of the current paths that, when activated, causes the current in the current path to appear smaller. The battery balancing control loop may also include an undervoltage lockout control loop that regulates a battery voltage of the circuits above an undervoltage lockout point. The undervoltage lockout control loop may include a comparator in each circuit that compares a voltage applied to the load to a reference voltage and, when the voltage applied to the load is below the reference voltage, the comparator triggers the current modulating means to override its current modulation and to add current to the current path.

A detailed description will now be provided with reference to FIGS. 1-10. Although this description provides a detailed description of possible implementations, it should be noted that these details are intended to be exemplary and in no way delimit the scope of the inventive subject matter. For example, while the description below is with respect to physically separated circuits in the temples or arms of an electronic eyewear device, it will be appreciated that the circuits and techniques described herein may be applied to any electronic device with circuits having different battery sources.

In sample configurations, the power management system described herein may be used in mobile devices including physically separated circuits powered by different batteries. FIG. 1A is a block diagram of a mobile device having circuits 110 and 120 that are physically separated from each other and powered independently. By way of example, FIGS. 1B and 1C illustrate an electronic eyewear device 100 having electronic circuits 110 and 120 in respective temples or arms thereof.

Figure 1B:
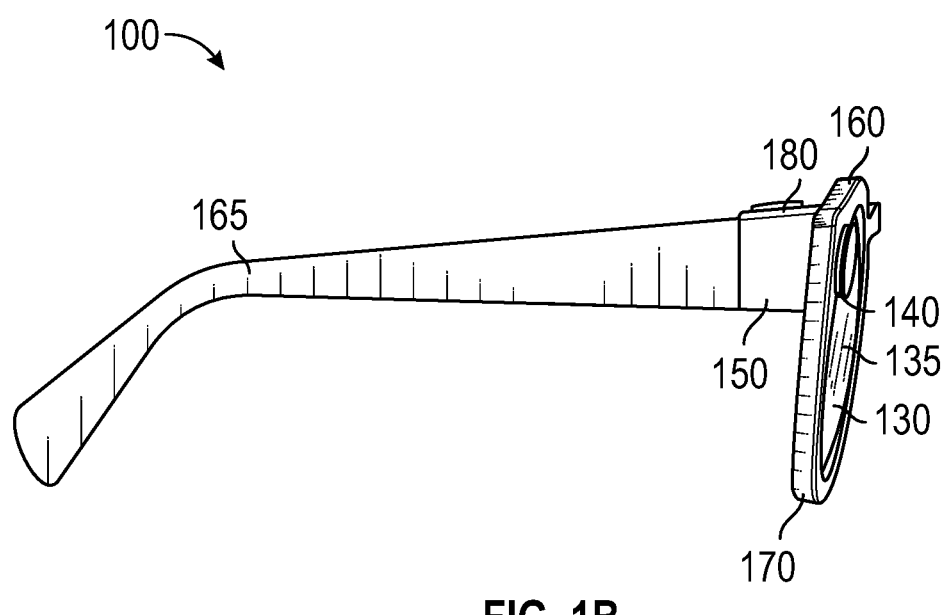
FIG. 1B is a side view of an example eyewear device including circuits in the arms or temples thereof.
Figure 1C:
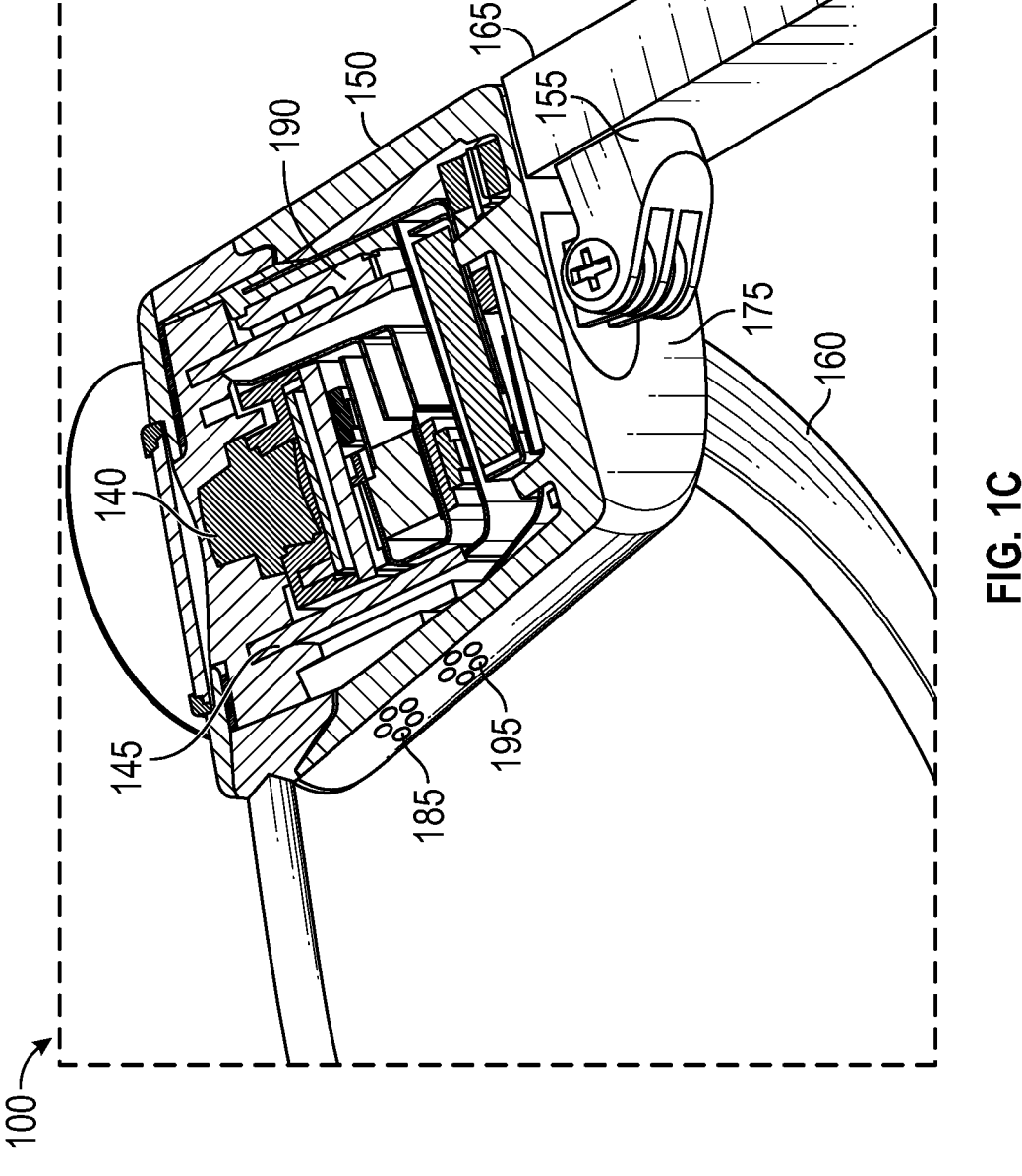
FIG. 1C is a top cross-sectional view of optical components and electronics in a portion of the eyewear device illustrated in FIG. 1B.

FIG. 1B is an illustration depicting a side view of an example hardware configuration of a mobile device in the form of an eyewear device 100 including an optical assembly 130 for each eye, each optical assembly including an image display 135 and a visible light camera 140 that together with a visible light camera for the other eye forms a stereo camera. The visible light camera 140 is located on a right temple 150 and a second visible light camera is located on a left temple of the eyewear device 100. In the illustrated example, the optical assembly 130 is located on the right side of the eyewear device 100. The optical assembly 130 also can be located on the left side or other locations of the eyewear devices 100.

The visible light camera 140 of each optical assembly 130 may include an image sensor that is sensitive to the visible light range wavelength. Each of the visible light cameras 140 has a different frontward facing angle of coverage. The angle of coverage is an angle range in which the respective image sensors of the visible light cameras 140 detect incoming light and generate image data. Examples of such visible lights cameras 140 include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 140 may be captured along with geolocation data, digitized by an image processor, and stored in a memory.

To provide stereoscopic vision, visible light cameras 140 may be coupled to an image processor (not shown) for digital processing and adding a timestamp corresponding to the scene in which the image is captured. The image processor may include circuitry to receive signals from the visible light cameras 140 and to process those signals from the visible light cameras 140 into a format suitable for storage in a memory. The timestamp may be added by the image processor or other processor that controls operation of the visible light cameras 140. Visible light cameras 140 allow the stereo camera to simulate human binocular vision. Stereo cameras also provide the ability to reproduce three-dimensional images of a three-dimensional scene based on two captured images from the visible light cameras 140, respectively, having the same timestamp. Such three-dimensional images allow for an immersive virtual experience that feels realistic, e.g., for virtual reality or video gaming. For stereoscopic vision, a pair of images may be generated at a given moment in time—one image for each of the visible light cameras 140 for each optical assembly 130 of each eye. When the pair of generated images from the frontward facing field of view (FOV) of the visible light cameras 140 are stitched together (e.g., by the image processor), depth perception is provided by the optical assemblies 130 for each eye.

In an example, the eyewear device 100 includes a frame 160, a right rim 170, a right temple 150 extending from a right lateral side 180 of the frame 160, and a see-through image display 135 comprising optical assembly 130 to present a graphical user interface (GUI) or other image to a user. The eyewear device 100 includes the first visible light camera 140 connected to the frame 160 or the right temple 150 to capture a first image of the scene. Eyewear device 100 further includes a second visible light camera (not shown) connected to the frame 160 or a left temple (not shown) to capture (e.g., simultaneously with the first visible light camera 140) a second image of the scene which at least partially overlaps the first image. Although not shown in FIG. 1B, an image processor is coupled to the eyewear device 100 and is connected to the visible light cameras 140 and a memory accessible to the processor, and programming in the memory may be provided in the eyewear device 100 itself.

Although not shown in FIG. 1B, the eyewear device 100 also may include a head movement tracker (element 190 of FIG. 1C) or an eye movement tracker (not shown). Execution of programming by the processor configures the eye-wear device 100 to perform functions, including functions to present, via the see-through image display 135, an initial displayed image of the sequence of displayed images, the initial displayed image having an initial field of view corresponding to an initial head direction or an initial eye gaze direction as determined by the eye movement tracker.

FIG. 1C is a top cross-sectional view of optical components and electronics in a portion of the eyewear device illustrated in FIG. 1B depicting the first visible light camera 140, a head movement tracker 190, and a circuit board 145. Construction and placement of the second visible light camera is substantially similar to the first visible light camera 140, except the connections and coupling are on the other lateral side of the eyewear device 100. As shown, the eyewear device 100 includes the first visible light camera 140 and a circuit board 145, which may be a flexible printed circuit board. A hinge 155 connects the right temple 150 to a hinged arm 165 of the eyewear device 100. In some examples, components of the first visible light camera 140, the flexible PCB 145, or other electrical connectors or contacts may be located on the right temple 150 or the hinge 155.

As shown in FIG. 1C, a right temple includes temple body 175 that is configured to receive a temple cap, with the temple cap omitted in the cross-section of FIG. 1C. Disposed inside the right temple 150 are various interconnected circuit boards, such as PCBs or flexible PCBs 145, that include controller circuits for the visible light camera 145, microphone(s) 185, speaker(s) 195, low-power wireless circuitry (e.g., for wireless short-range network communication via BLUETOOTH®), high-speed wireless circuitry (e.g., for wireless local area network communication via WI-FI®), and a power source.

The first visible light camera 140 is coupled to or disposed on the flexible PCB 145 and covered by a visible light camera cover lens, which is aimed through opening(s) formed in the right temple 150. In some examples, the frame 160 connected to the right temple 150 includes the opening (s) for the visible light camera cover lens. The frame 160 may include a front-facing side configured to face outwards away from the eye of the user. The opening for the visible light camera cover lens may be formed on and through the front-facing side. In the example, the visible light camera 140 has an outward facing angle of coverage with a line of sight or perspective of the right eye of the user of the eyewear device 100. The visible light camera cover lens also can be adhered to an outward facing surface of the right temple 150 in which an opening is formed with an outward facing angle of coverage, but in a different outwards direction. The coupling can also be indirect via intervening components.

Flexible PCB 145 may be disposed inside the right temple 150 and coupled to one or more other components housed in the right temple 150. Although shown as being formed on the circuit boards 145 of the right temple 150, the visible light camera 140 can be formed on another circuit board (not shown) in one of the left temple, the hinged arm 155, the hinged arm 165, or the frame 160.

As illustrated in FIG. 1A, the circuit 110 in a left temple or arm of the electronic eyewear device 100 may be generally represented as a battery 112, a charger 114, a temple resistance 116, and a load 118. Similarly, circuit 120 in a right temple 150 or arm 165 of the electronic eyewear device 100 may be generally represented as a battery 122, a charger 124, a temple resistance 126, and a load 128. The circuit 110 and the right circuit 120 are physically separated by the frame 160 of the glasses, which is represented in FIG. 1A as a frame resistance 160.

Figure 2:
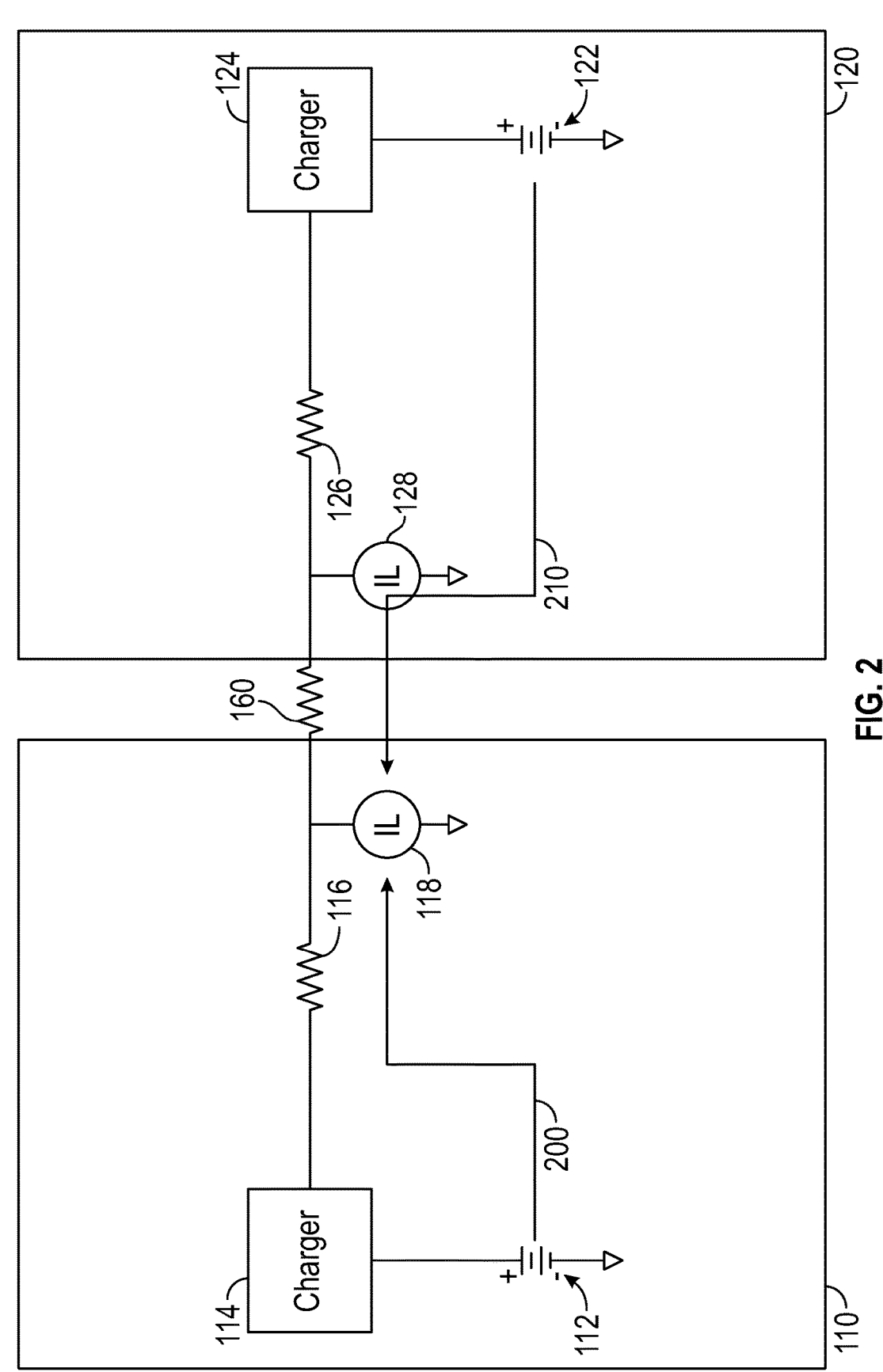
FIG. 2 illustrates the current flow in the system of FIGS. 1A-1C where the load on the left side of the electronic eyewear device is dominant, in accordance with some examples.

FIG. 2 illustrates the current flow in the system of FIG. 1A where the load 118 in the circuit 110 in the left temple or arm of the electronic eyewear device 100 is dominant. In this case, the load 118 draws a large current from battery 112 as indicated by arrow 200 and also draws some current from battery 122 of the circuit 120 in the right temple or arm as indicated by arrow 210. Such current drawn by the load 118 causes a mismatch between the discharge rates of the batteries 112 and 122.

Different options for addressing this mismatch between the discharge rates of the batteries 112 and 122 will be described below with respect to FIGS. 3-10. The configurations reduce (or substantially minimize) the discharge mismatch by increasing the resistance or decreasing the battery voltage on the side of the electronic eyewear device 100 experiencing the higher battery discharge rate, boosting the voltage or decreasing the resistance on the other side of the electronic eyewear device 100 to balance the loads, or both. In other words, using Ohms law I=V/R, the current I may be decreased on one side of the electronic eyewear device 100 by decreasing the voltage V, by increasing the resistance R, or both, and the current I may be increased on one side of the electronic eyewear device 100 by increasing the voltage V, by decreasing the resistance R, or both, as appropriate to balance the loads on the respective sides of the electronic eyewear device 100. The circuits described with respect to FIGS. 3-10 function to continuously match the DC current provided by the batteries 112 and 122 to improve battery health, reliability and safety. The described techniques do so with minimal software interaction and with a reduced electrical circuit design complexity.

Figure 3:
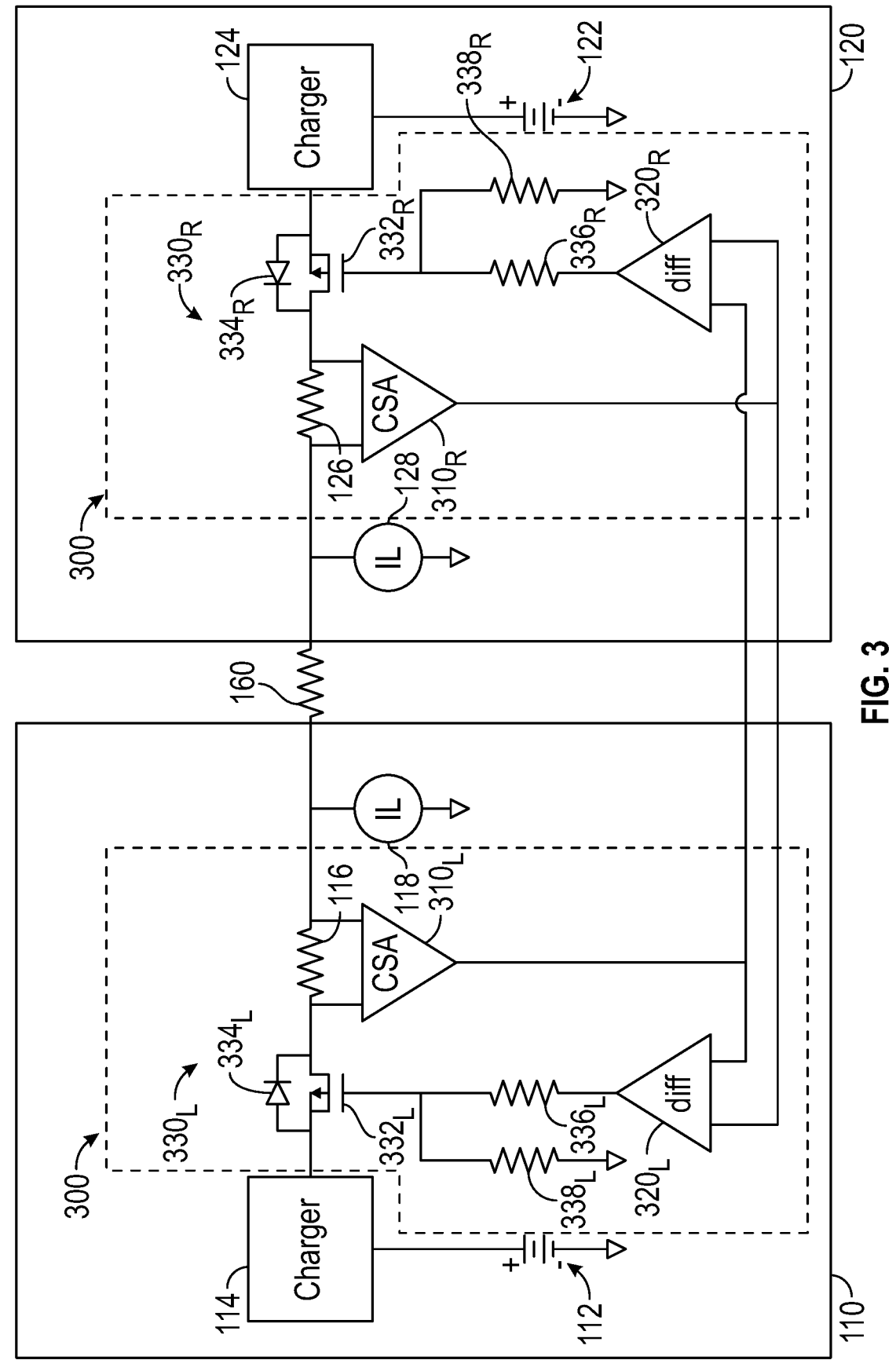
FIG. 3 is a block diagram of a power management system including a current balancing control loop that actively regulates the battery current paths so that the current is approximately the same in the circuits on each side based on the load, in accordance with some examples.
Figure 4:
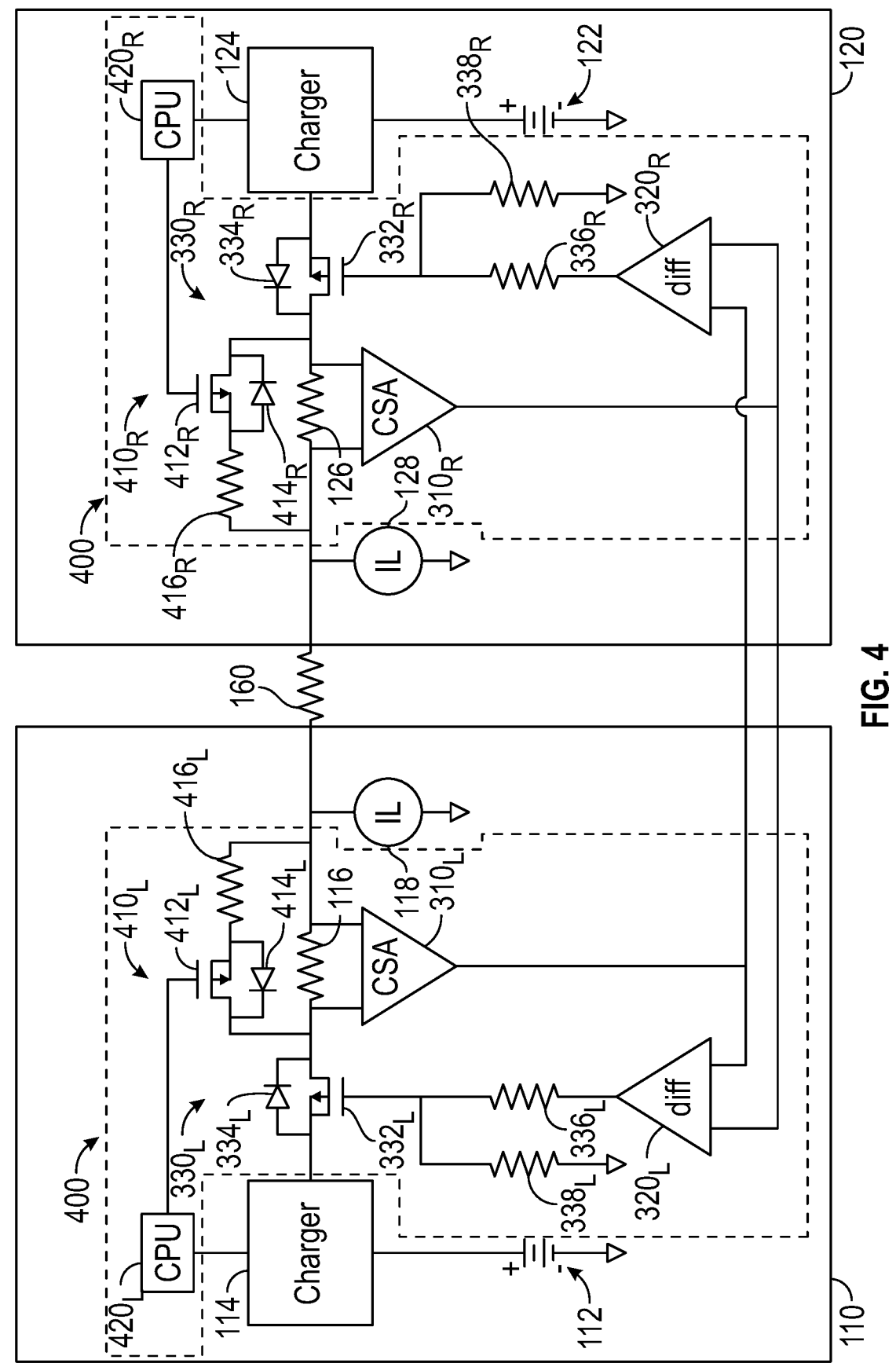
FIG. 4 is a block diagram of a power management system including the current balancing control loop of FIG. 3 modified to include a tilting circuit, in accordance with some examples.
Figure 5:
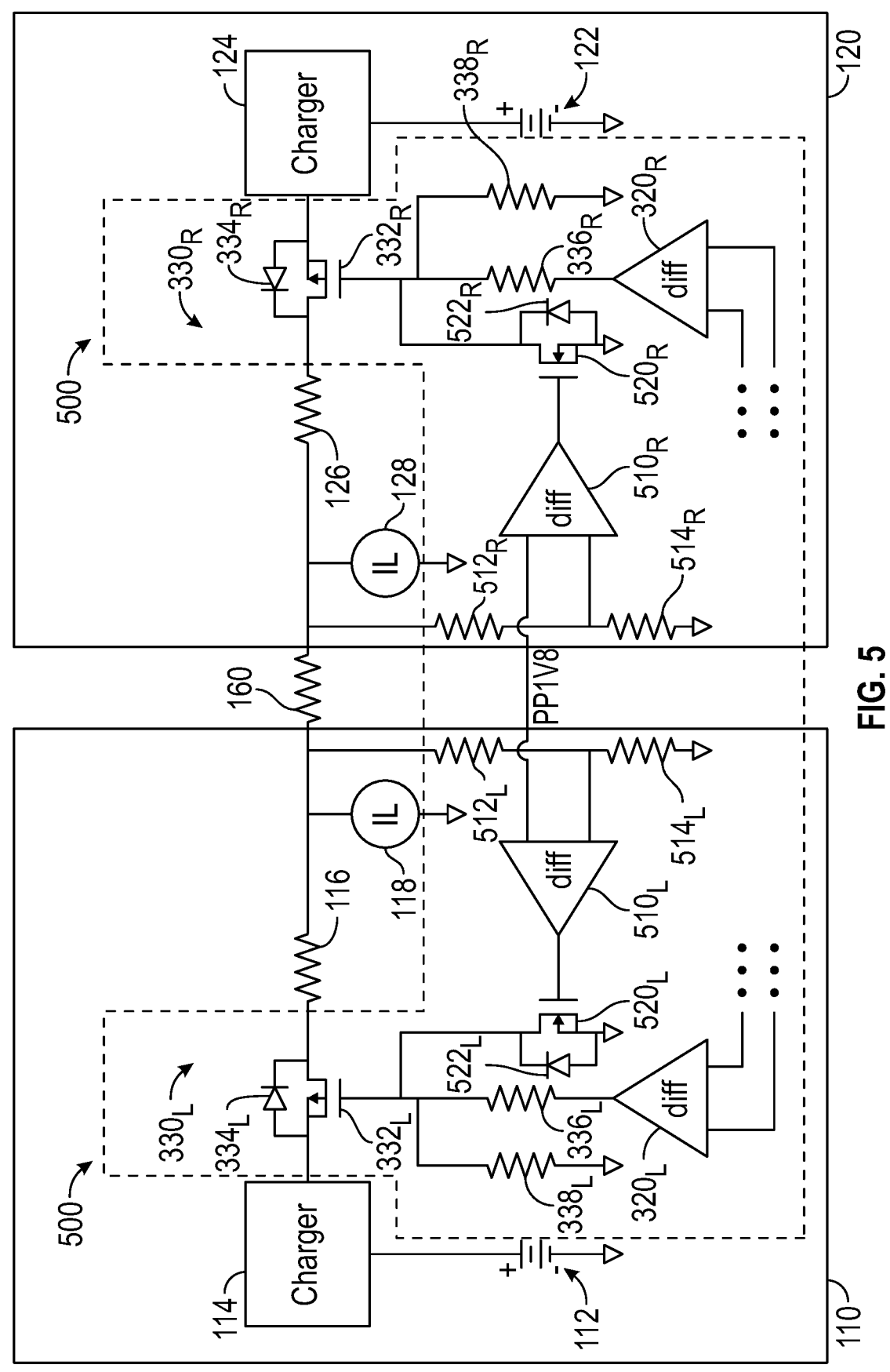
FIG. 5 is a block diagram of a power management system including the current balancing control loop of FIG. 3 modified to include an undervoltage lockout (UVLO) circuit control loop, in accordance with some examples.
Figure 6:
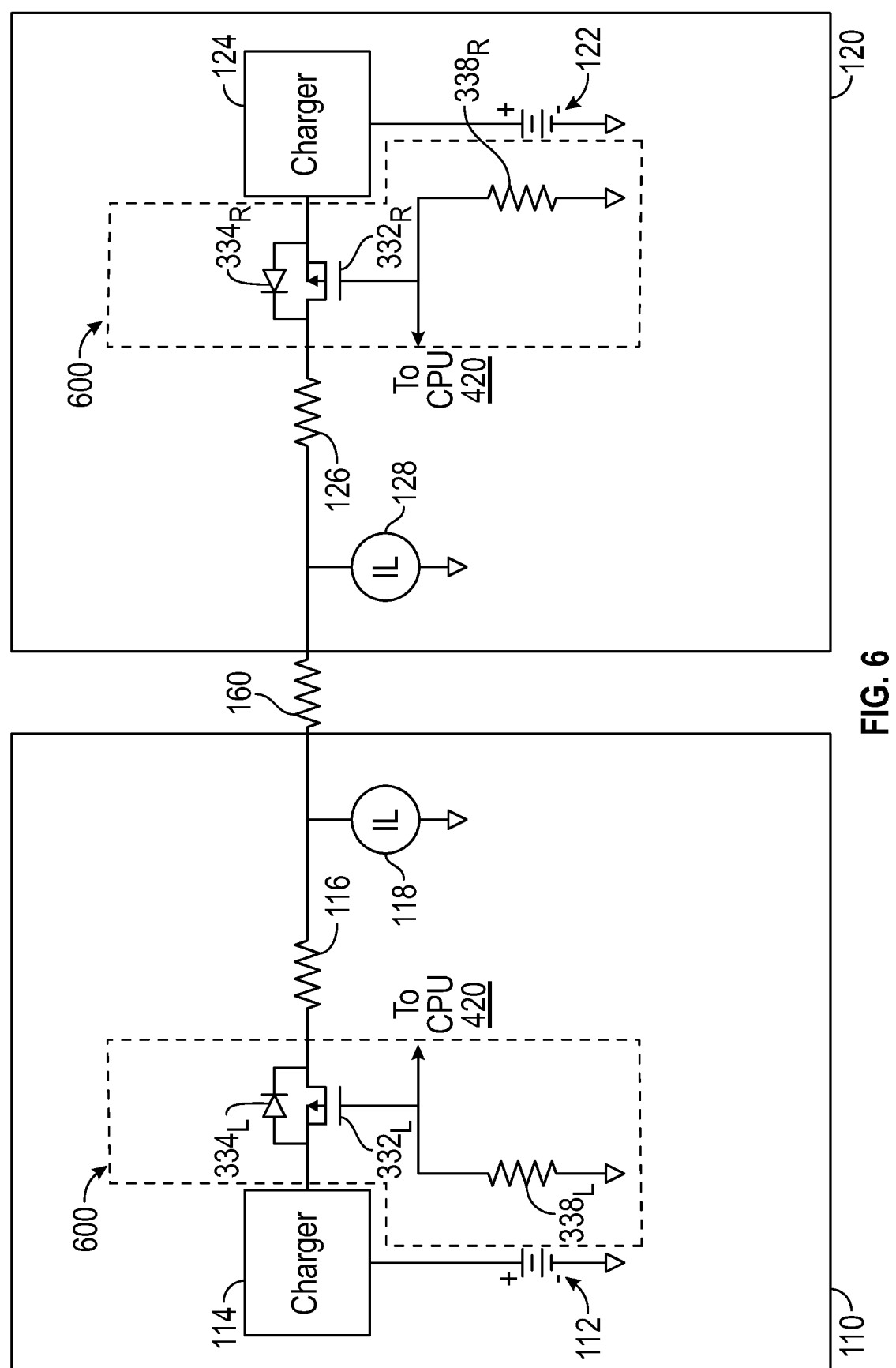
FIG. 6 is a block diagram of a power management system including a disable circuit for disabling all features during exceptionally high or low load power consumption, in accordance with some examples.
Figure 7:
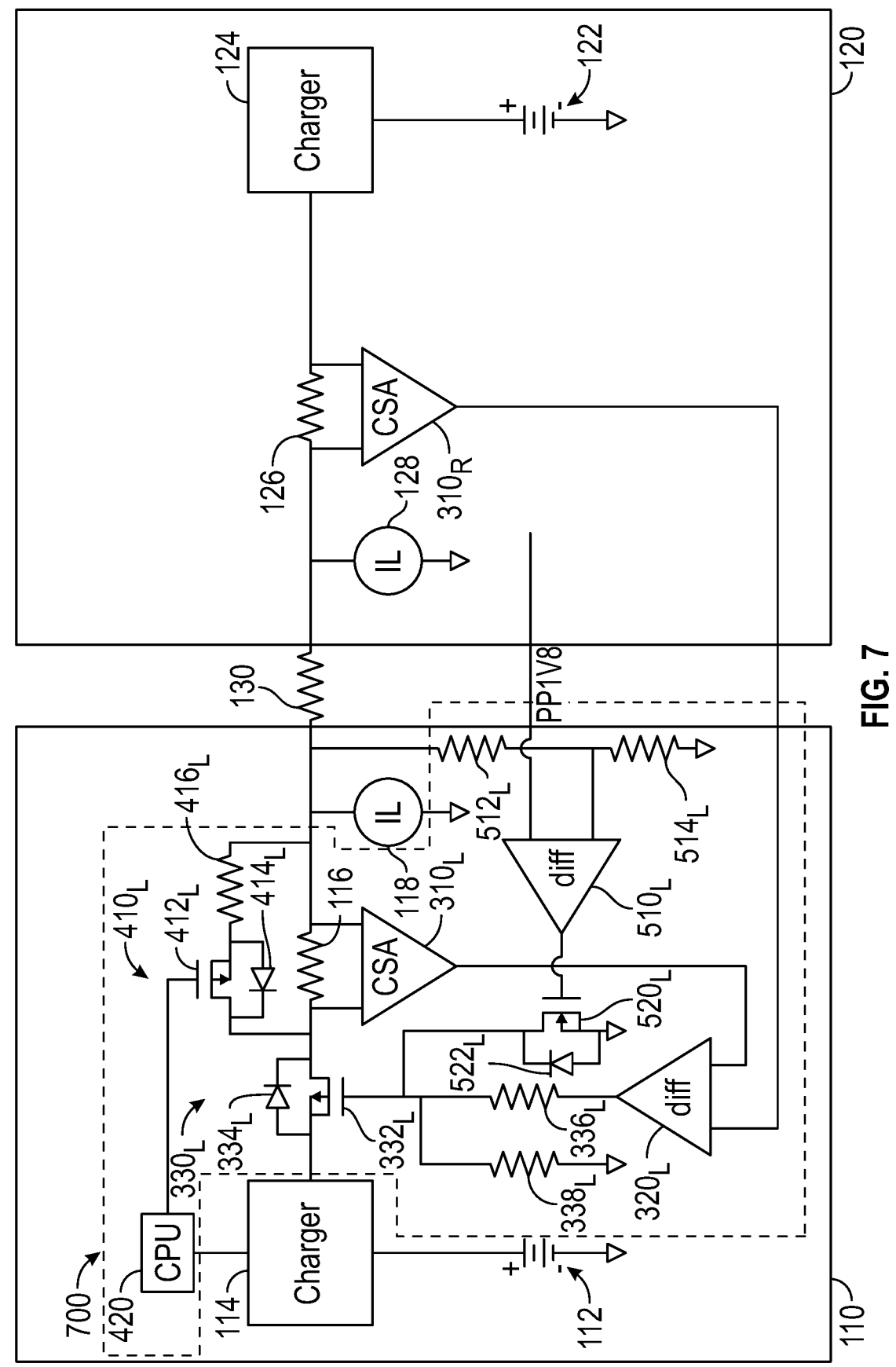
FIG. 7 is a block diagram of a power management system including the current balancing control loop of FIG. 3 modified to disable a single side's set of battery balancing features when it is predicted that one side will have the dominant load, in accordance with some examples.

In the circuit configurations described herein, the high side current of each battery on respective sides of the electronic eyewear device 100 is measured and fed into a closed loop control system that performs functions including:

actively regulating the battery current paths so that the battery current is approximately the same on each side based on the load (FIG. 3);

tilting the balance between the circuits if there is an existing battery discharge mismatch (FIG. 4);

managing UVLO situations when either battery is nearing empty (almost completely discharged) (FIG. 5);

disabling features when the system current is exceptionally high (i.e., higher than an upper threshold) and turning off the circuit when system current is exceptionally low (i.e., lower than a lower threshold) (FIG. 6); and disabling a single side's set of battery balancing features when it is predicted that one side will have the dominant load (FIG. 7).

Figure 9A:
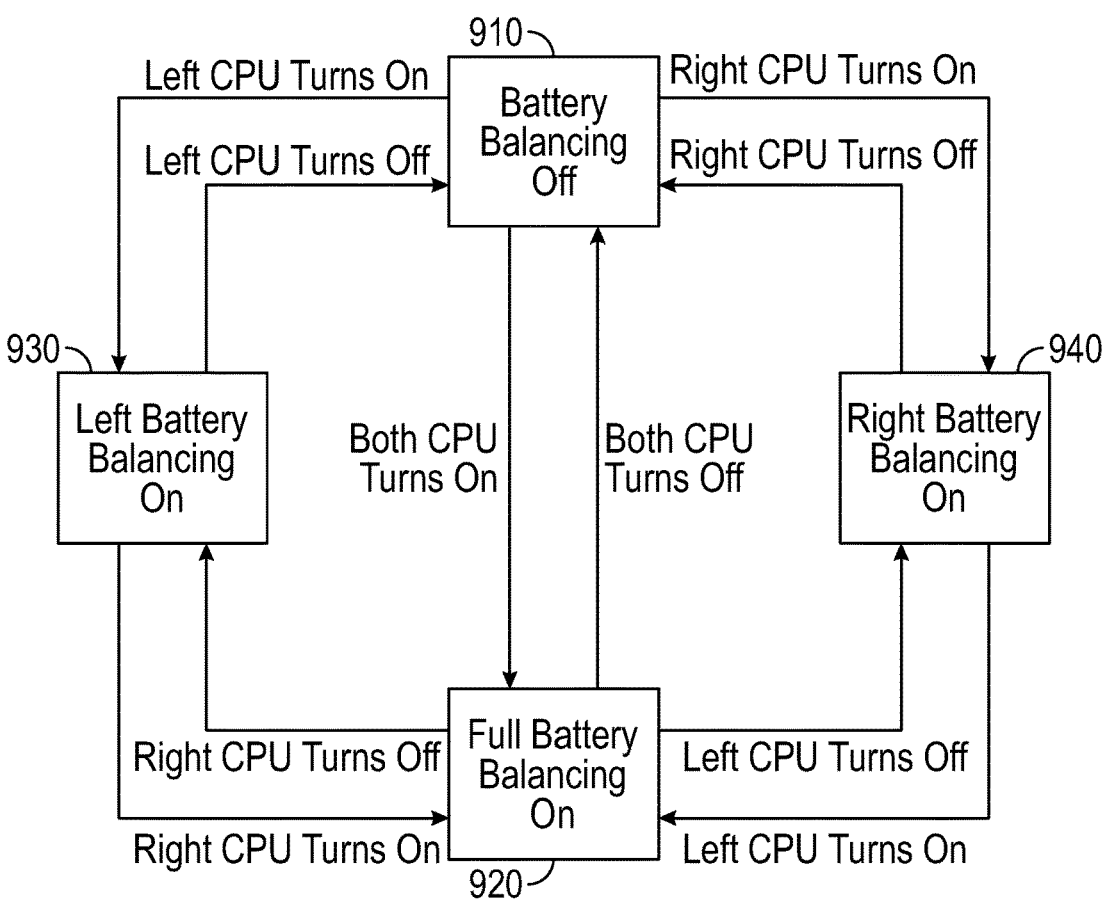
FIG. 9A illustrates a state machine for the different modes of operation of battery balancing by the current balancing control loop described with respect to FIG. 8.
Figure 9B:
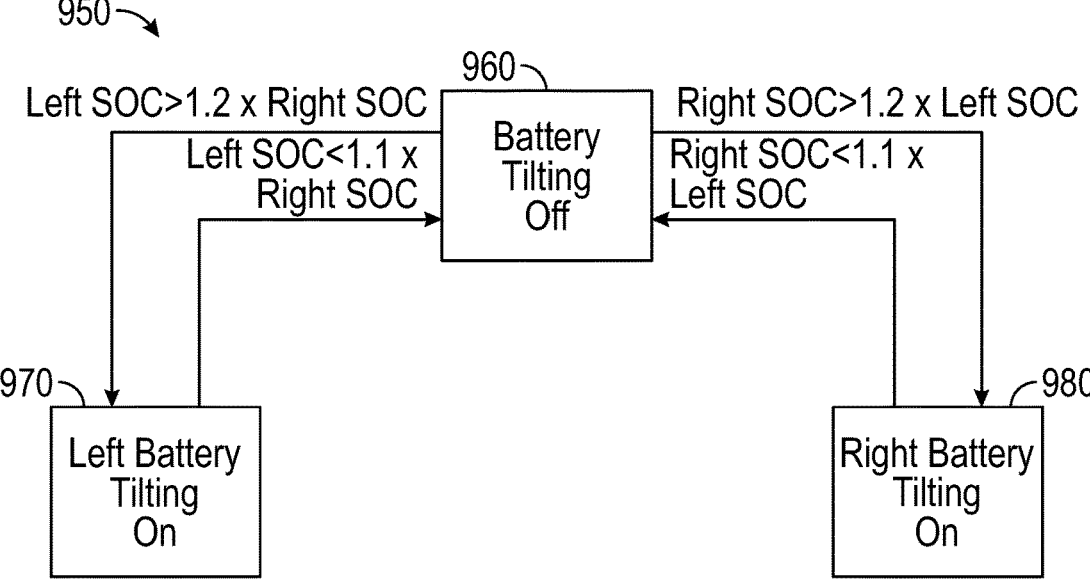
FIG. 9B illustrates a state machine for the different modes of operation of the battery tilting feature of FIG. 4.
Figure 10:
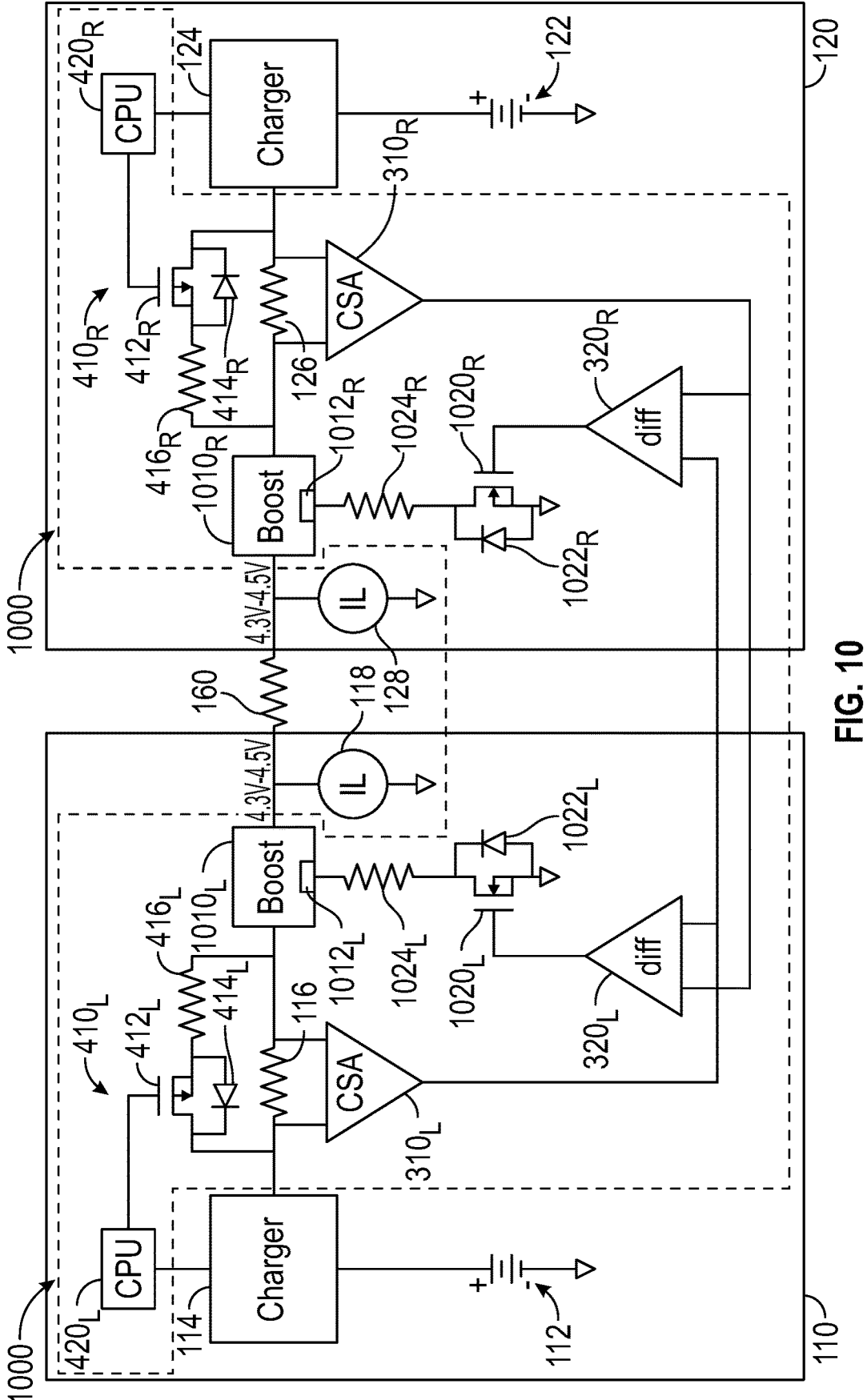
FIG. 10 is a block diagram of a power management system including a boost converter circuit that independently boosts the battery voltages as opposed to limiting the battery voltages as in FIGS. 3-9.

The battery current paths are modulated to achieve a balanced current by modulating transistors used to independently limit the current in the left/right battery current paths (FIGS. 3-9), or by modulating the voltage output of DC/DC converters (e.g., boost circuits) to independently boost the current in the left/right battery baths (FIG. 10). Each of these configurations will be described below.

FIG. 3 is a block diagram of a power management system including a current balancing control loop 300 including elements $310_L$, $320_L$, and $330_L$ in circuit 110 and elements $310_R$, $320_R$, and $330_R$ in circuit 120 that actively regulate the battery current paths of the circuits 110 and 120 so that the currents through circuits 110 and 120 are substantially equal.

The electrical currents through the circuits 110 and 120 change according to the respective loads 118 and 128 in the circuits 110 and 120. As illustrated, the circuit 110 (120) includes a current sensing amplifier (CSA) 310$_L$ (310$_R$) that measures the current through the resistance 116 (126). The output of the CSA 310$_L$ (310$_R$) is provided to the differential amplifier 320$_L$ (320$_R$) to provide adjustment signals via circuit 330$_L$ (330$_R$) based on the differences in the measured currents. As illustrated, the circuit 330$_L$ includes power field effect transistor (PFET) 332$_L$, forward directed diode 334$_L$, and resistors 336$_L$ and 338$_L$, and the circuit 330$_R$ includes PFET 332$_R$, forward directed diode 334$_R$, and resistors 336$_R$ and 338$_R$. In particular, the differential amplifier 320$_L$ (320$_R$) modulates the PFET 332$_L$ (332$_R$) in the current path to dynamically limit the current by dynamically adjusting the resistance. For example, when the circuit 310$_L$ is "ON," the PFET 332$_L$ (332$_R$) is open and the resistance through the PFET 332$_L$ (332$_R$) is low. However, when differences are detected between the measured currents through the temple resistances 116 and 126, the differential amplifier 320$_L$ (320$_R$) modulates the PFET 332$_L$ (332$_R$) to dynamically increase the resistance in the circuit 110 (120) that has a larger measured current, thus aligning the resistances and currents on both sides of the electronic eyewear device 100.

During operation, when the left circuit 110 has a dominant load, the PFET 332$_R$ on the side opposite the dominant load is ON while the PFET 332$_L$ on the side of the dominant load limits the current by increasing resistance to match the other side. It will be recognized that there is an inherent offset (Delta_IBatt) with this solution. The inherent offset (Delta_IBatt) depends on the voltage (VBattery) of the battery 112 and 122, the voltage (Vth) across the PFETs 332$_L$ and 332$_R$, the gain (Amp Gain) of the differential amplifiers 320$_L$ and 320$_R$, the voltage outputs (Amp Vos) of the differential amplifiers 320$_L$ and 320$_R$, and the respective tolerances. The response time is limited by the CSAs 310$_L$ and 310$_R$ and the differential amplifiers 320$_L$ and 320$_R$ (pending stability). When the loads 118 and 128 are very similar or equal, up to Delta_IBatt, both PFETs 332$_L$ and 332$_R$ will be ON, while above Delta_IBatt, the balancing provided by increasing the resistance in one circuit 110 or 120 will be effective.

FIG. 4 is a block diagram of a power management system including the current balancing control loop 400 where the current balancing control loop 300 of FIG. 3 is modified to include tilting circuits 410$_L$ (including FET 412$_L$, reverse directed diode 414$_L$, and resistor 416$_L$) and 410$_R$ (including FET 412$_R$, reverse directed diode 414$_R$, and resistor 416$_R$) that periodically check the batteries 112 and 122 for any significant mismatch and prioritize the side with the lighter load until the charges of the batteries 112 and 122 are substantially equalized. During operation, a CPU 420$_L$ or 420$_R$ may periodically check the state of charge of the batteries 112 and 122 as provided by the chargers 114 and 124 to determine any significant mismatch. If there is a mismatch, the TILT_FET 412$_L$ or 412$_R$ will be enabled on the side with higher state of charge. This will cause the measured current through the corresponding temple resistance 116 or 126 to appear smaller, thereby tricking the CSAs 310$_L$ and 310$_R$ and causing the balance circuits 330$_L$ and 330$_R$ to prioritize the side with the higher state of charge. For example, if the left battery 112 is more discharged, the CPU 420$_R$ turns on the TILT_FET 412$_R$, which tricks the CSAs 310$_L$ and 310$_R$ into thinking that the current is lower through temple resistance 126 than through temple resistance 116, causing differential amplifier 320$_L$ to restrict the current through PFET 332$_L$. Once the charges of the batteries 112 and 122 are substantially equalized, the CPU 420$_R$ determines that the state of charge is balanced and the enabled TILT_FET 412$_R$ is turned off. CPU 420$_L$ may also perform these functions, as appropriate, or a single CPU 420 may be provided to perform these functions.

The tilt accuracy of the current balancing control loop 400 depends on tolerances of the measured resistances (Rds_on, Rsense, Rseries). For example, when Rsense=10 m, Rseries=20 m, and 7.3 m<Rds_on<12.6 m, the tilt range is 23%-27%.

FIG. 5 is a block diagram of a power management system including the current balancing control loop 300 of FIG. 3 modified to include an undervoltage lockout (UVLO) circuit control loop 500 to regulate the battery voltage of circuits 110 and 120 above the UVLO point. As illustrated, a second control loop including differential amplifiers (comparators) 510$_L$ and 510$_R$, FETs 520$_L$ and 520$_R$, diodes 522$_L$ and 522$_R$, and resistances 512$_L$, 514$_L$, 512$_R$, and 514$_R$ are added to regulate the battery voltage of each circuit 110 and 120 above the UVLO point. For the left circuit 110, the battery voltage is measured at the load 118 through resistors 512$_L$ and 514$_L$ and compared to a reference voltage (PP1V8) by comparator 510$_L$. If the voltage is too low, the comparator 510$_L$ will trigger BATT_FET 520$_L$ to be ON to pull down the gate of PFET 332$_L$ as necessary to override the balancing by balance circuit 330$_L$ as well as the tilt circuit 410$_L$ (FIG. 4). If the resistance is too high, current is added instead of more resistance in order to keep the circuit 110 alive as long as possible. Limiting the peak load in this manner lowers the voltage to temporarily provide a higher current. The same process is applied to the right circuit 120 using elements 510$_R$, 520$_R$, 522$_R$, 512$_R$, and 514$_R$. The UVLO control loop 500 thus keeps the circuits 110 and 120 alive as long as possible.

It will be appreciated that, just like with current balancing, there is an inherent current mismatch with the UVLO control loop 500. Fortunately, the UVLO point may be varied to add enough margin to provide balancing. For example, high/low thresholds may be set that are 5-10% from the minimum/maximum voltages, as appropriate for the implementation. These thresholds may be set by a processor, such as CPUs 420$_L$ or 420$_R$ (FIG. 4). The response time is limited by the differential amplifier 510$_L$ or 510$_R$, which may operate at, for example, 0.2 MHz, and by any low pass filtering used to provide stability. The UVLO control loop 500 further may act as a safety net for any instability or slow response time in the balancing circuitry 330$_L$. On the other hand, the UVLO control loop 500 knowingly adds mismatch to the batteries 112 and 122.

FIG. 6 is a block diagram of a power management circuit including a disabling circuit 600 for disabling all features during exceptionally high or low load power consumption. During exceptionally high or low load power consumption, at least one of the CPUs 420$_L$ or 420$_R$ can disable all features by opening PFET 332$_L$ or PFET 332$_R$ to turn off all control loops. In high power cases, this will disable any battery current limiting, while in low power cases, this will reduce standby power consumption. Thus, for an exceptionally low load, there is no need to balance, while for an exceptionally high load, there is a need to disable battery current limiting.

In certain circuit implementations, it will be easy to predict which circuit 110 or 120 will have the dominant load. FIG. 7 is a block diagram of a power management system including the current balancing control loop 300 of FIG. 3 modified to disable the set of battery balancing features of circuit 120 when it is predicted that the circuit 110 always will have the dominant (peak) load. In this case, the CPU 420$_R$ (not shown) can disable the set of battery balancing features of the circuit 120 to reduce standby power consumption and to improve the control loop stability margins. The control loop features 700 may be maintained for the circuit 110, as shown in FIG. 7.

Figure 8:
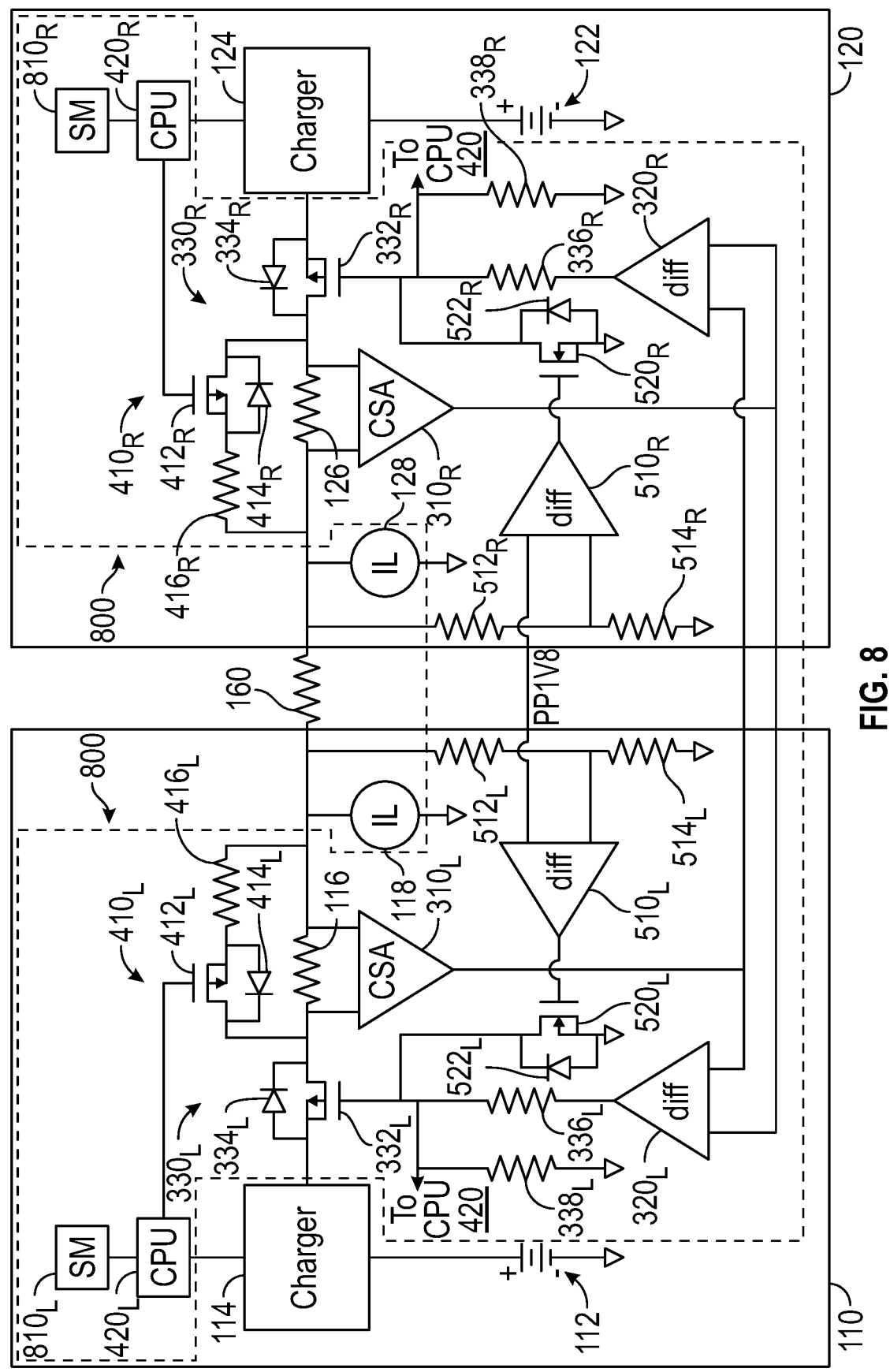
FIG. 8 is a block diagram of a power management system combining the features of FIGS. 3-7 in one circuit diagram.

FIG. 8 is a block diagram of a power management system combining the features of FIGS. 3-7 in one circuit 800. In particular, FIG. 8 includes the current balancing control loop 300 of FIG. 3, the tilting circuit 410 of FIG. 4, the UVLO control loop 500 of FIG. 5, the disabling circuit 600 of FIG. 6, and the load mismatch circuit 700 of FIG. 7. FIG. 8 also includes CPUs $420_L$ and $420_R$ that are used to control the tilting circuit 410 and the disabling circuit 600. The modes of operation of the circuit 800 are controlled by the CPUs $420_L$ and $420_R$, based on the state machines $810_L$ and $810_R$, which are implemented by each CPU $420_L$ and $420_R$ as described below with respect to FIGS. 9A and 9B.

For simplicity, the state machines $810_L$ and $810_R$ implemented by CPUs $420_L$ and $420_R$ may be divided into a state machine 900 for battery balancing (FIG. 9A) and a state machine 950 (FIG. 9B) for battery tilting. The state machines 900 and 950 may be controlled by a low-power microcontroller (not shown) which is separate from the CPUs $420_L$ and $420_R$. FIGS. 9A and 9B use CPUs $420_L$ and $420_R$ to demonstrate that dynamic loads may be operated independently on either side of electronic eyewear device 100 in the examples.

FIG. 9A illustrates a state machine 900 for the different modes of operation of battery balancing by the current balancing control loop 800 described with respect to FIG. 8. As illustrated, when both CPUs $420_L$ and $420_R$ are OFF, the CPUs $420_L$ and $420_R$ are in state 910, and battery balancing is OFF. On the other hand, when both CPUs $420_L$ and $420_R$ are ON, the CPUs $420_L$ and $420_R$ are in state 920, and battery balancing is ON. When only the left CPU $420_L$ is ON, the CPUs $420_L$ and $420_R$ are in state 930 where the left battery balancing is ON. Similarly, when only the right CPU $420_R$ is ON, the CPUs $420_L$ and $420_R$ are in state 940 where the right battery balancing is ON. The battery balancing features are enabled accordingly.

FIG. 9B illustrates a state machine 950 for the different modes of operation of the battery tilting feature of the tilting circuit 410 of FIG. 8. In accordance with the state machine 950, the battery tilting feature is OFF at state 960 when the state of charge of one battery is no more than 1.2 times the state of charge of the other battery. When the state of charge of the left battery 112 exceeds 1.2 times the state of charge of the right battery 122, the left battery tilting feature is turned ON at state 970. The left battery tilting feature is then turned OFF when the state of charge of the left battery 112 is less than 1.1 times the state of charge of the right battery 122 and the state machine returns to state 960. Similarly, when the state of charge of the right battery 122 exceeds 1.2 times the state of charge of the left battery 112, the right battery tilting feature is turned ON at state 980. The right battery tilting feature is then turned OFF when the state of charge of the right battery 122 is less than 1.1 times the state of charge of the left battery 112 and the state machine returns to state 960.

In an alternative configuration, the left or right battery voltage may be independently boosted as opposed to limiting the battery voltage as in the configurations of FIGS. 3-9. FIG. 10 is a block diagram of a power management system including a boost converter circuit 1000 that independently boosts the left or right battery voltages as opposed to limiting the voltages as in FIGS. 3-9. The boost converter circuit 1000 in FIG. 10 includes a boost circuit $1010_L$ for the left circuit 110 and a boost circuit $1010_R$ for the right circuit

120. Each boost circuit $1010_L$ and $1010_R$ includes a voltage adjustment pin $1012_L$ or $1012_R$ that is used to modulate the voltage output by the boost circuit $1010_L$ or $1010_R$ in response to any voltage imbalances measured by differential amplifiers $320_L$ and $320_R$. As illustrated, the boost converter circuit 1000 may include FET $1020_L$, diode $1022_L$, and resistance $1024_L$ that provide a voltage modulation signal to boost circuit $1010_L$ that increases the current applied to the load 118 to match the current applied to the load 128 by increasing the voltage output by the boost circuit $1010_L$. The boost converter circuit 1000 also may include FET $1020_R$, diode $1022_R$, and resistance $1024_R$ that provide a voltage modulation signal to boost circuit $1010_R$ that increases the current applied to the load 128 to match the current applied to the load 118 by increasing the voltage output by the boost circuit $1010_R$.

In the configuration of FIG. 10, the differential amplifiers $320_L$ and $320_R$ modulate the voltage adjustment pin $1012_L$ or $1012_R$ of the boost circuits $1010_L$ and $1010_R$ to dynamically boost the voltage applied to the loads 118 or 128. In a sample configuration, the boost circuits $1010_L$ and $1010_R$ may be DC/DC converters configured to boost the output voltage in response to the inputs provided at the voltage adjustment pins $1012_L$ or $1012_R$. By boosting the voltages, any electrical resistance 160 seen through the frame between the left temple circuit 110 and the right temple circuit 120 may be overcome.

It will be appreciated that the control loop approach used in FIG. 10 is inherently safe as it can never cut off the battery current path by accident. The control loop approach used in FIG. 10 also can be more efficient depending on the application. It will be further appreciated that the control loop approach used in FIG. 10 can better handle high power use cases by boosting both batteries. The control loop approach used in FIG. 10 also is better suited to handle UVLO use cases due to the superior Vin requirements of the boost circuits $1010_L$ and $1010_R$.

However, it also will be appreciated that the control loop approach used in FIG. 10 may severely limit stability and response time because of the internal control loops of the DC/DC converters used in the boost circuits $1010_L$ and $1010_R$. Thus, the control loop approach used in FIG. 10 also can be less efficient depending on the application. The closed loop approach used in FIG. 10 also may have an increased size and cost as compared to the configurations of FIGS. 3-8.

Those skilled in the art will appreciate that the circuitry described herein may be analog or digital circuitry. However, digital circuitry is potentially more expensive and may require the control loops to be implemented using software that could add to the cost, complexity, and response time.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

The logic, commands, or instructions that implement aspects of the methods described herein may be provided in a computing system including any number of form factors for the computing system such as desktop or notebook personal computers, mobile devices such as tablets, net-books, and smartphones, client terminals and server-hosted machine instances, and the like. Another embodiment may include the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The functions described herein with respect to the CPUs 420 may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, microcontrollers, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to electronic eyewear devices having separately powered circuits in physically separate portions of the electronic eyewear device, it should be understood that this is only one of many possible appli-cations, and other configurations are possible. Accordingly, all such applications are included within the scope of the following claims.

What is claimed is:

1. A device comprising:
a first circuit comprising a first battery, a first load, and a first resistance in a first current path to the first load;
a second circuit comprising a second battery, a second load, and a second resistance in a second current path to the second load, the second circuit being physically separated from the first circuit;
a battery balancing control loop for balancing charges of the first and second batteries, the battery balancing control loop comprising:
a first current measuring circuit that measures a first current through the first resistance,
a second current measuring circuit that measures a second current through the second resistance,
a differential amplifier that compares the first current and the second current to generate an adjustment signal, and
current modulating means for modulating the first current in the first current path in response to the adjustment signal to balance the charges of the first and second batteries.

2. The device of claim 1, wherein the current modulating means modulates the first current in the first current path by at least one of (a) increasing the first resistance or decreasing a battery voltage of the first battery or (b) boosting the battery voltage of the first battery or decreasing the first resistance.

3. The device of claim 1, wherein the battery balancing control loop further comprises:
a second differential amplifier that compares the first current and the second current to generate a second adjustment signal, and
second current modulating means for modulating the second current in the second current path in response to the second adjustment signal to balance the charges of the first and second batteries.

4. The device of claim 3, wherein the second current modulating means modulates the second current in the second current path by at least one of (a) increasing the second resistance or decreasing a second battery voltage of the second battery or (b) boosting the second battery voltage of the second battery or decreasing the second resistance.

5. The device of claim 1, wherein the current modulating means comprises a transistor in the first current path of the first circuit that dynamically limits the first current in the first current path by dynamically adjusting the first resistance in the first current path in response to the adjustment signal until the first current and the second current are approximately the same.

6. The device of claim 1, wherein the battery balancing control loop further comprises a tilting circuit that checks a charge state of the first and second batteries to determine a charge mismatch and discharges the battery with a higher charge until the charge state of the first and second batteries are substantially equal.

7. The device of claim 6, wherein the tilting circuit comprises a transistor in the first current path of the first battery that, when activated, causes the first current to appear smaller.

8. The device of claim 7, wherein the tilting circuit comprises a second transistor in the second current path of the second battery that, when activated, causes the second current to appear smaller.

9. The device of claim 1, wherein the battery balancing control loop further comprises an undervoltage lockout control loop comprising a first comparator that compares a first voltage applied to the first load to a reference voltage and, when the first voltage applied to the first load is below the reference voltage, the first comparator triggers the current modulating means to override its current modulation and to add current to the first current path.

10. The device of claim 9, wherein the undervoltage lockout control loop further comprises a second comparator that compares a second voltage applied to the second load to the reference voltage and, when the second voltage applied to the second load is below the reference voltage, the second comparator triggers the second current modulating means to override its current modulation and to add current to the second current path.

11. The device of claim 1, wherein the current modulating means comprises a DC/DC converter responsive to the adjustment signal to increase current in the first current path to balance the first current and the second current.

12. A method of balancing battery discharge of physically separated circuits each comprising a battery, a load, and a resistance in a current path to the load, comprising:

measuring a current provided to the load from the battery of each circuit;

comparing the currents measured for each circuit to determine a current mismatch; and adjusting the resistance or a voltage to reduce a current of the circuit having the higher current or to increase a current of the circuit having the lower current to balance the charges of the batteries of the circuits.

13. The method of claim 12, wherein adjusting the resistance or voltage comprises at least one of (a) increasing the resistance or decreasing a battery voltage to decrease a current of the circuit having a higher current to balance the charges of the batteries of the circuits or (b) boosting a battery voltage or decreasing the resistance to increase a current of the circuit having the lower current to balance the charges of the batteries of the circuits.

14. The method of claim 13, wherein the circuits comprise a first circuit having a first battery, a first power transistor, and a first resistance in a first current path to a first load and a second circuit having a second battery, a second power transistor, and a second resistance in a second current path to a second load, and wherein adjusting the resistance or voltage further comprises modulating the first power transistor in the first current path to the first load to dynamically adjust the first resistance to limit the current in the first current path when the first current path has a higher measured current than the second current path of the second circuit.

15. The method of claim 12, further comprising checking charges of the batteries for any significant charge mismatch and prioritizing the circuit with a lighter load until the charges of the batteries are substantially equal.

16. The method of claim 12, wherein adjusting the resistance or voltage further comprises adjusting the resistance or voltage to adjust the charge of the battery of at least one of the circuits to remain above an undervoltage lockout point.

17. The method of claim 12, further comprising determining that a current of at least one of the circuits is higher than an upper current threshold and disabling adjustment of the resistance or voltage of the at least one of the circuits when the current of the at least one of the circuits is higher than the upper threshold.

18. The method of claim 12, further comprising determining that a current of at least one of the circuits is lower than a lower current threshold and turning off the at least one of the circuits when the current of the at least one of the circuits is lower than the lower current threshold.

19. The method of claim 12, further comprising determining that one of the circuits is predicted to have a dominant load and disabling adjustment of the resistance or voltage of the one of the circuits when it determined that the one of the circuits is predicted to have a dominant load.

20. An electronic eyewear device comprising:

a frame;

a left arm or temple on a left side of the frame;

a right arm or temple on a right side of the frame;

a first circuit in the left arm or temple comprising a first battery, a first load, and a first resistance in a first current path to the first load;

second circuit in the right arm or temple comprising a second battery, a second load, and a second resistance in a second current path to the second load, the second circuit being physically separated from the first circuit by the frame;

a battery balancing control loop for balancing charges of the first and second batteries, the battery balancing control loop comprising:

a first current measuring circuit that measures a first current through the first resistance, a second current measuring circuit that measures a second current through the second resistance, a differential amplifier that compares the first current and the second current to generate an adjustment signal, and current modulating means for modulating the first current in the first current path in response to the adjustment signal to balance the charges of the first and second batteries.

\*   \*   \*   \*   \*